United States Patent [19]
Roehl

[11] Patent Number: 5,596,472
[45] Date of Patent: Jan. 21, 1997

[54] PROCESS FOR CONTROLLING AN OVERCURRENT TRIPPING DEVICE OF A HIGH-SPEED D.C. CIRCUIT-BREAKER

[75] Inventor: Wolfgang Roehl, Berlin, Germany

[73] Assignee: Siemens Aktiengesellschaft, Munich, Germany

[21] Appl. No.: 299,688

[22] Filed: Sep. 1, 1994

Related U.S. Application Data

[63] Continuation-in-part of Ser. No. 936,967, Aug. 28, 1992, abandoned.

[30] Foreign Application Priority Data

Aug. 30, 1991 [DE] Germany .................. 41 29 258.8

[51] Int. Cl.⁶ .................................................. H02H 3/00
[52] U.S. Cl. ........................................ 361/93; 361/87
[58] Field of Search ........................ 361/87, 93, 94, 361/98, 23, 24, 28, 96, 97, 110, 95

[56] References Cited

U.S. PATENT DOCUMENTS 3,914,667  10/1975  Waldron ............................ 317/36
4,259,706   3/1981  Zocholl ............................ 361/96

FOREIGN PATENT DOCUMENTS 1965425  8/1973  Germany .
2653574  1/1978  Germany .

OTHER PUBLICATIONS

"Neues Streckenschutz–Konzept gegen Speiseleitungsstörungen bei Gleichstrom–Verkehrsnetzen," *Brown Boveri Mitt*, No. 9/10–83, pp. 372–378 (1983).

*Primary Examiner*—Jeffrey A. Gaffin
*Assistant Examiner*—Sally O. Medley
*Attorney, Agent, or Firm*—Kenyon & Kenyon

[57] ABSTRACT

A process for controlling an overcurrent tripping device of a high-speed d.c. circuit breaker. The input voltage can reach a signal evaluation device for current rise rate via two different paths. The tripping of the high-speed d.c. circuit-breaker is no longer fundamentally delayed by the unavoidable delay experienced by signals applied to a filtering device. A path for the input voltage, existing in parallel to the filter path can be designed such that when the current rises very steeply, the unfiltered (and thus also undelayed) signal reaches the signal evaluation device (i.e., the signal bypasses the filter and is applied to the signal evaluation device) whereas, when the current rises more slowly, the filtered signal is evaluated.

2 Claims, 2 Drawing Sheets

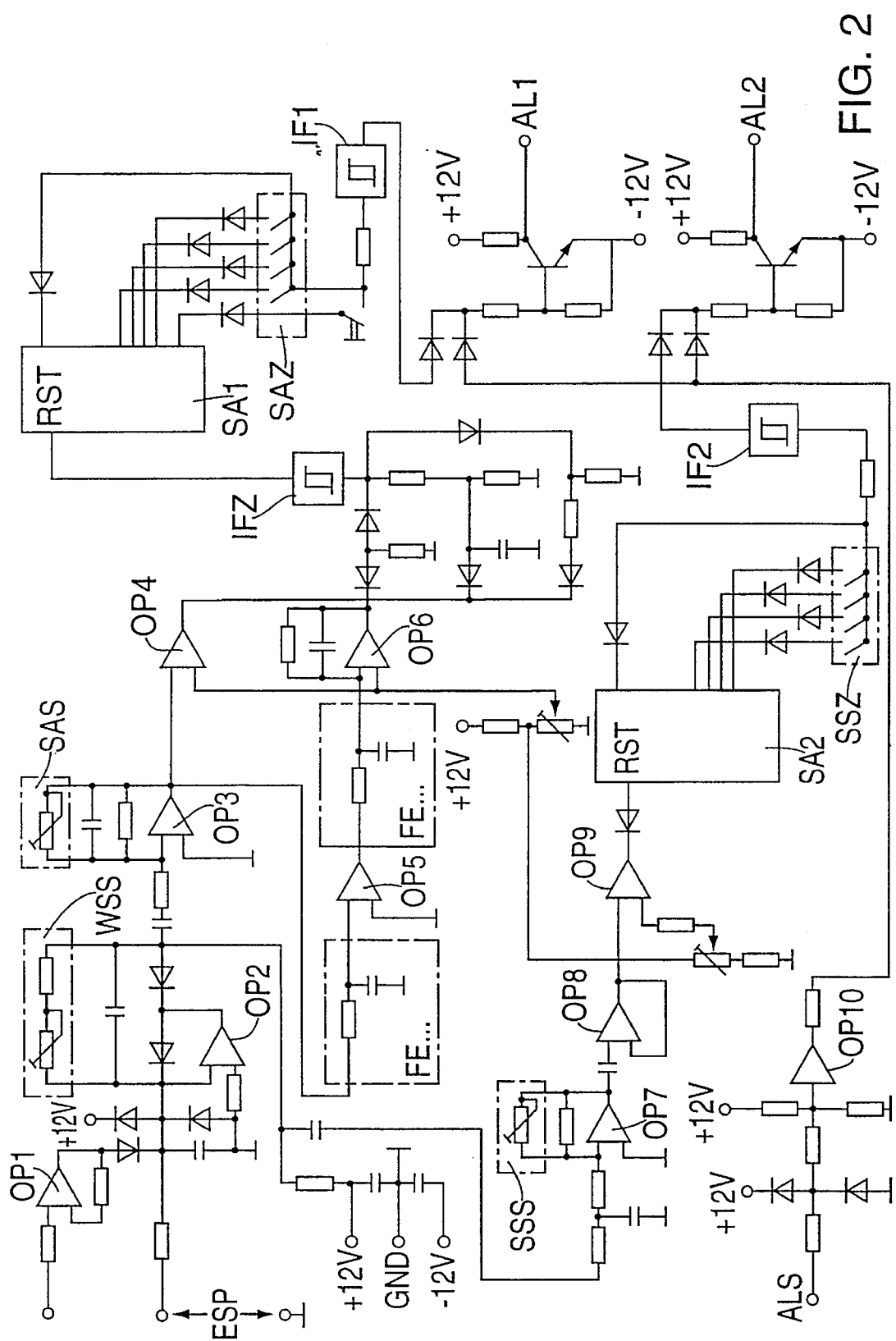

PROCESS FOR CONTROLLING AN OVERCURRENT TRIPPING DEVICE OF A HIGH-SPEED D.C. CIRCUIT-BREAKER

CROSS-REFERENCE TO RELATED APPLICATIONS

The present application is a continuation-in-part of U.S. patent application Ser. No. 07/936,967 filed on Aug. 28, 1992 now abandoned.

BACKGROUND OF THE INVENTION

The present invention relates to a process for controlling an overcurrent tripping device of a high-speed d.c. circuit-breaker, particularly high-speed d.c. circuit-breakers for power supply systems which feed electric d.c.-operated railway lines. A transformer is provided in the d.c. circuit and a filtering device connected on the output side of the transformer for producing an input voltage from which a signal, dependent on the rate of rise of the current (di/dt) as well as a signal corresponding to any sudden change in current, is derived. A first disconnect signal can be generated from these signals via parallel signal evaluation devices. The first disconnect signal is for the high-speed d.c. circuit-breaker in conjunction with a current-rise-time controller and a second disconnect signal in conjunction with a current-step-change controller.

A process of the above described type has been described by the article "Neues Streckenschutzkonzept gegen Speiseleitungsstörungen bei Gleichstrom-Verkehrsnetzen" ("New pilot-wire protection concept against supply line interference in d.c. transit networks") in the German publication *Brown Boveri Mitteilungen* (*Brown Boveri News*), 9/10-83, pp. 372–378. One of the protection devices described therein uses the magnitude of the current step changes δI and, in parallel to this, the current rise as a function of time (di/dt) as a basis for tripping. Despite using this combined measuring criteria for the current, the reliability of the tripping process can prove unsatisfactory if interference exists on the current flowing in the power supply system. Such interference can be due, in particular, to the conventional method of operation of the rectifier plants which feed d.c.-operated railway lines. This is related to the fact that the d.c. current needed to run d.c.-operated railway lines is generated by rectifying the current supplied by a three-phase a.c. system. A ripple is thus superimposed on the d.c. current flowing through the d.c.-operated railway lines. This ripple is also detected by the protection device.

The object of the present invention is to improve the process discussed in the above mentioned article for controlling an overcurrent tripping device such that a ripple superimposed on the d.c. current does not cause erroneous tripping of the high-speed d.c. circuit-breaker.

SUMMARY OF THE PRESENT INVENTION

The present invention solves this objective by designing the filtering device to eliminate interference voltages ≧300 Hz and by permitting the input voltage to be additionally fed to a signal evaluation device for evaluating the current rise via a bypass of the filtering device.

Since the input voltage can reach the signal evaluation device for the current rise via two different paths, the tripping of the high-speed d.c. circuit-breaker is no longer fundamentally delayed by the unavoidable delay experienced by signals applied to the filtering device. The path for the input voltage, existing in parallel to the filter path can be designed such that when the current rises very steeply, the unfiltered (and thus also undelayed) signal reaches the signal evaluation device (i.e., the signal bypasses the filter and is applied to the signal evaluation device) whereas, when the current rises more slowly, the filtered signal is evaluated. In this case, the delay of the signal produced by the filtering device is not disruptive since, when the rate of rise of the current is low, longer tripping time delays are provided anyway. These tripping time delays can exceed the delay produced by the filtering device by several multiples.

BRIEF DESCRIPTION OF THE DRAWINGS

The present invention is explained hereafter in more detail based on the exemplary embodiment depicted in the figures.

FIG. 2 is a schematic of a circuit of an overcurrent tripping device for controlling a high-speed d.c. circuit-breaker depicted schematically in FIG. 1.

DETAILED DESCRIPTION

Figure 1:
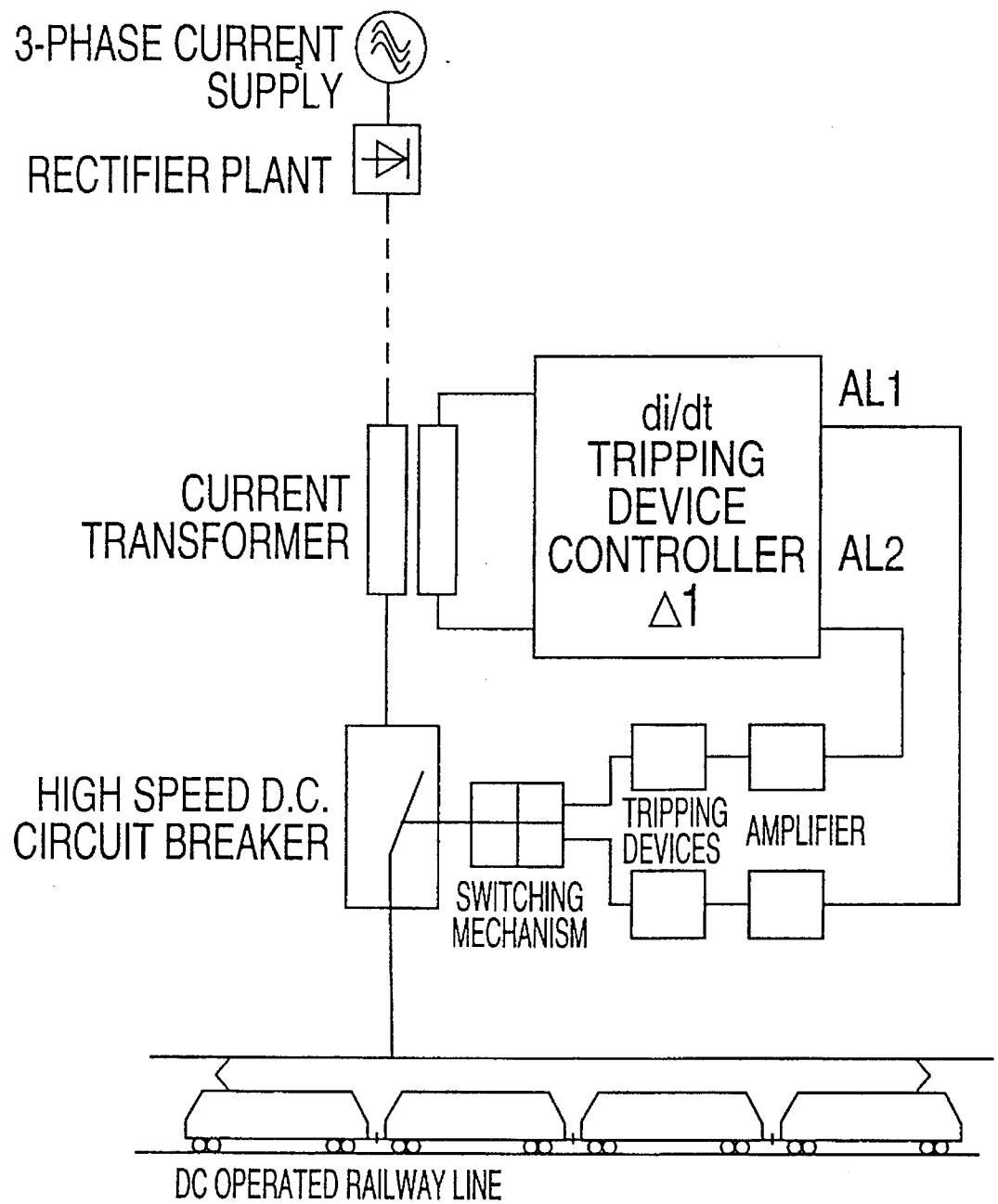
FIG. 1 is a block diagram which illustrates the general layout of a power supply system for d.c.-operated railway lines.

According to FIG. 1, the traction current for a d.c.-operated railway line (e.g., a train in a subway system or in a high-speed commuter network) is generated from a three-phase current supply via a rectifier plant and is fed to the d.c.-operated railway line using a high-speed d.c. circuit-breaker. The power supply system also includes a current transformer. An overcurrent tripping device is connected to the secondary side of the current transformer and includes a tripping device controller which produces tripping signals AL1 and/or AL2. The tripping signal AL1 is a function of the change of the current (from the rectifier plant) with respect to time (di/dt). The tripping signal AL2 is a function of a step change in the magnitude of the current δI.

The overcurrent tripping device includes the tripping device controller and tripping devices coupled with the output side of the tripping device controller via amplifiers. Tripping signals AL1 or AL2 are fed to the tripping devices via amplifiers. The tripping devices act on a switching mechanism of the high-speed d.c. circuit-breaker and can bring it into the open position. The tripping devices are generally fast-acting solenoids having armatures which release mechanical latches in the switching mechanism. The design of the tripping device controller is explained hereafter with reference to FIG. 2. In FIG. 2, small rectangular boxes depict resistors.

The input voltage $V_{ESP}$ delivered by the current transformer shown in FIG. 1 is current-limited by a transformer/current controller WSS. The rate-of-rise-of-current controller SAS determines the rate of rise of current at which the overcurrent tripping device carries out a tripping operation. The measured current is fed via operational amplifiers OP to a central pulse shaping device IFZ which then feeds it to a signal evaluation device SA1. A current-rise-time controller SAZ is allocated to the signal evaluation device SA1. The current-rise-time controller SAZ uses the signal evaluation device SA1 to specify the maximum reaction time for triggering the overcurrent tripping device. A pulse shaping device IF1 is coupled, on the output side, with a switching stage (not shown) and provides the tripping signal AL1 as an output.

In parallel to the operation described above, the input voltage $V_{ESP}$ also reaches a filtering device FE which is designed to eliminate interference voltages having frequencies $\geq 300$ Hz. The choice of a frequency of 300 Hz as the lower limit of the filtering device FE is based on the fact that, when generating d.c. current from a three-phase alternating current having a frequency of 50 Hz, harmonics having a frequency of 300 Hz or 600 Hz arise depending on the chosen circuit arrangement. Analogously, in countries where the three-phase power supply operates at a frequency of 60 Hz, the harmonics have a frequency of 360 or 720 Hz. A filtering device FE, designed to filter out frequencies $\geq 300$ Hz, is thus effective with alternating current supply networks operating at a frequency of 50 Hz or 60 Hz and all customary rectifier circuit arrangements.

As can be recognized, in addition to the central pulse shaping device IFZ, a circuit section which can be characterized as a network of resisters, diodes and a capacitor is also connected on the input side of the signal evaluation device SA1. The signal output by the operational amplifier OP3 is fed to this circuit section, on the one hand, directly via an operational amplifier OP4 and, on the other hand, via the filtering device FE and a further operational amplifier OP6. As a result, when a steep current rise occurs, the unfiltered signal reaches the signal evaluation device SA1, and when the current rises slowly, the filtered signal reaches the signal evaluation device SA1. In this manner, the overcurrent tripping device can trip the high-speed d.c. circuit-breaker in a desired manner, i.e., very quickly, when it is necessary (i.e., when di/dt is large). When the current rise is not so steep (i.e., when di/dt is small), in contrast, errors in the choice of the tripping delay, due to the tripping device controller confusing the rate of rise of the harmonics with a rate of rise related to a fault in the power supply of the d.c.-operated railway line, are avoided.

Furthermore, a current-step-change controller SSS is provided for evaluating the input voltage $V_{ESP}$ and more specifically evaluates current step changes above a set value such that a second tripping signal AL2 is output. This occurs following a time period which is determined by a current-step-change-time controller SSZ, which is also provided.

With regard to the mode of operation of the control elements depicted in the circuit diagram according to FIG. 2, it should be noted that the rate-of-rise-of-current controller SAS and the current-step-change controller SSS are implemented in the conventional manner as rheostats or as potentiometers, which affect the gain of the allocated operational amplifier OP3 or rather OP7. On the other hand, the current-rise-time controller SAZ and the current-step-change-time controller SSZ can be implemented preferably as known rotary encoding switches with which a binary number can be set that acts as the limit for a counting operation taking place in the signal evaluation device SA1 or rather the signal evaluation device SA2.

Independent of the method described above for controlling the overcurrent tripping device, a manual means of outputting a tripping signal also exists. The connection point ALS is provided for this purpose whereby an output signal AL1 as well as a tripping signal AL2 can be triggered via an operational amplifier OP10.

What is claimed is:

1. In a d.c. circuit including a high-speed d.c. circuit-breaker coupled in series with a transformer, the transformer generating an output signal as a function of a current through the d.c. circuit, an apparatus for controlling an overcurrent tripping device of the high-speed d.c. circuit-breaker comprising:

a current rate of rise controller for generating a first signal from the output signal of the transformer, the first signal being representative of a rate of rise of the current through the d.c. circuit;

a filtering device coupled to the current rate of rise controller for generating a filtered signal from the first signal, wherein the filtering device filters noise signals having a frequency greater than or equal to 300 Hz;

a first signal evaluation circuit coupled to the rate of rise controller and to the filtering device, the first signal evaluation circuit generating a first disconnect signal for controlling the high-speed d.c. circuit-breaker in accordance with one of the first and filtered signals;

a current step change controller for generating a second signal from the output signal of the transformer, the second signal being representative of a magnitude of change of the current through the d.c. circuit; and a second signal evaluation circuit for generating a second disconnect signal for controlling the high-speed d.c. circuit-breaker in accordance with the second signal.

2. The apparatus of claim 1, wherein:

the first signal evaluation circuit generates the first disconnect signal in accordance with the first signal when the rate of rise of the current through the d.c. circuit is at least as large as a predetermined rate, and the first signal evaluation circuit generates the first disconnect signal in accordance with the filtered signal when the rate of rise of the current through the d.c. circuit is less than the predetermined rate.

\* \* \* \* \*